United States Patent
Asato et al.

(10) Patent No.: US 7,302,158 B1
(45) Date of Patent: Nov. 27, 2007

(54) DATA RECORDING/REPRODUCING APPARATUS AND METHOD

(75) Inventors: Yoichiro Asato, Kanagawa (JP); Makoto Tabuchi, Kanagawa (JP); Masakazu Murata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 09/831,328

(22) PCT Filed: Sep. 8, 2000

(86) PCT No.: PCT/JP00/06167

§ 371 (c)(1),
(2), (4) Date: May 7, 2001

(87) PCT Pub. No.: WO01/18811

PCT Pub. Date: Mar. 15, 2001

(30) Foreign Application Priority Data

Sep. 9, 1999 (JP) .............................. P11-256351

(51) Int. Cl.
*H04N 5/93* (2006.01)
(52) U.S. Cl. .......................................... 386/52; 386/95
(58) Field of Classification Search ................. 386/46, 386/52, 55, 65
See application file for complete search history.

(56) References Cited

U.S. PATENT DOCUMENTS

| 5,717,663 A | 2/1998 | Fujita |
| 5,760,767 A | 6/1998 | Shore et al. |
| 5,995,471 A * | 11/1999 | Saoyama et al. ........ 369/47.13 |
| 6,236,802 B1 * | 5/2001 | Yamamoto .................... 386/52 |
| 6,434,323 B1 * | 8/2002 | Hayashi ...................... 386/104 |

FOREIGN PATENT DOCUMENTS

| EP | 0 801 389 | | 10/1997 |
| EP | 1 001 623 | | 5/2000 |
| JP | 9-163310 | | 6/1997 |
| JP | 9-233374 | | 9/1997 |
| JP | 10-164497 | | 6/1998 |
| JP | 10-248048 A | * | 9/1998 |
| JP | 10341389 | * | 12/1998 |

* cited by examiner

*Primary Examiner*—Huy Nguyen
(74) *Attorney, Agent, or Firm*—Frommer Lawrence & Haug LLP; William S. Frommer; Paul A. Levy

(57) ABSTRACT

When second material data is inserted into first material data, in point and out point are set in the first material data and the second material data to generate editing processing information. On the basis of the editing processing information, there are prepared first virtual file in which recording area of recording medium with respect to the first material data is described by time codes and second virtual file in which recording area of the recording medium with respect to the second material data is described by time codes. Thus, reproduction is carried out from preroll point positioned forward in point of time with respect to the in point up to postroll point positioned backward in point of time with respect to the out point.

17 Claims, 12 Drawing Sheets

VFLFILENAME
VIDEO
1-ST MATERIAL DATA  00:00:00:00  00:00:05:00
2-ND MATERIAL DATA  00:00:10:00  00:00:15:00
3-RD MATERIAL DATA  00:00:05:00  00:00:10:00
AUDIO
1-ST MATERIAL DATA  00:00:00:00  00:00:05:00
2-ND MATERIAL DATA  00:00:10:00  00:00:15:00
3-RD MATERIAL DATA  00:00:05:00  00:00:10:00

FIG.5

FILE ENTRY (FE)

| FILE NAME |
|---|
| LINK TO FIRST RE |
| START TIME (START TIME CODE) |
| PRODUCER/PRODUCTION DATE, etc. |

RECORD ENTRY (RE)

| LINK TO NEXT RE |
|---|
| LEADING POSITION DATA |
| CONTINUOUS AREA |

FREE SPACE LIST (FSL)

| LINK TO NEXT FSL |
|---|
| LEADING POSITION DATA |
| CONTINUOUS AREA |

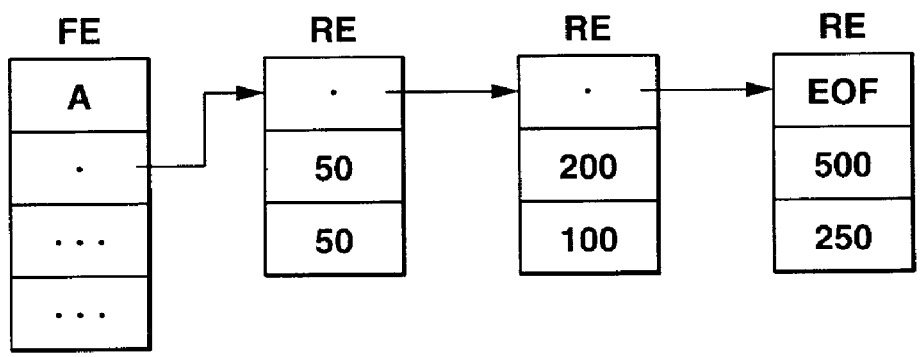
FIG.8
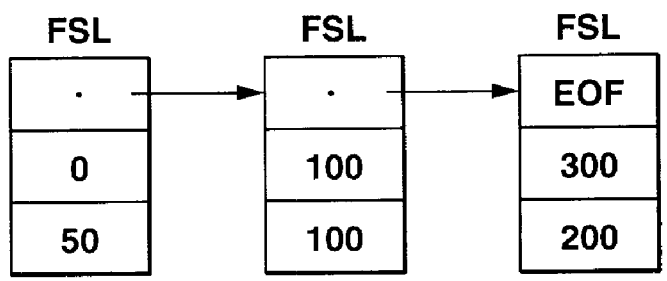
FIG.9
| FILE NAME | REPRODUCTION START POSITION | REPRODUCTION END POSITION |
FIG.10

DATA RECORDING/REPRODUCING APPARATUS AND METHOD

TECHNICAL FIELD

This invention relates to a data recording/reproducing apparatus and a data recording/reproducing method adapted for setting editing points at plural data recorded with respect to a non-linearly reproducible recording medium, thus to carry out editing processing.

BACKGROUND ART

In recent years, followed by realization of multi-channel structure of information providing by popularization of CATV (Cable Television), etc., unlike conventional VTRs (Video Tape Recorders) provided with tape-shaped recording medium, there are demands to record and reproduce, at the same time, plural video/audio data from single video/audio data recording/reproducing apparatus, and to reproduce such video/audio data while recording them, etc. To satisfy such demands, there are being popularized apparatuses called video server for recording/reproducing video/audio data by using random accessible recording medium such as hard disc, etc.

Such video servers are adapted so that a large number of non-linearly reproducible large capacity hard disc units are connected to have recording capacity of several tens to several hundreds giga bytes as a whole. Such video servers are suitable for recording data in which data quantity of audio data and video data or any either one of them, etc. is extremely large. Particularly, since arbitrary audio data or video data can be reproduced in a short access time, such video servers are excellent as recording/reproducing unit for editing apparatus.

Such video servers hold information for carrying out management of positions on hard discs of files recorded on respective hard disc units to carry out management of video/audio data recorded on respective hard discs. Moreover, when such video servers carry out editing processing of video/audio data, they prepare file editing information called VFL (Virtual File List) consisting of file name information and continuous data length information, etc. Such video servers designate the file name information and the continuous data length information, etc. to thereby prepare VFL thus to carry out editing processing. At this time, video servers only reproduce VFL to read out, from respective hard discs, video/audio data which has been caused to undergo editing processing by making reference to VFL at the time of reproduction processing without re-recording video/audio data onto the hard disc at the time of editing processing.

As described above, video servers adapted for preparing VFL to carry out editing processing have different feeling of operation of user from linear editing of conventional VTR provided with tape-shaped recording medium. For user who carried out linear editing using conventional VTR, editing processing result using non-linearly accessible recording medium would be feeling of disagreement.

DISCLOSURE OF THE INVENTION

This invention has been proposed in view of circumstances as described above, and its object is to provide a data recording/reproducing apparatus and a data recording/reproducing method capable of carrying out emulation of VTR operation even if editing processing is carried out by using data recorded on non-linearly reproducible recording medium.

This invention is directed to a data recording/reproducing apparatus comprising a non-linearly accessible recording medium, recording/reproducing means for recording/reproducing material including video and/or audio data with respect to the recording medium, and plural input/output processing means for processing the material inputted from the external to output it to the recording/reproducing means, and for processing reproduction material outputted from the recording/reproducing means to output it to the external, wherein the respective input/output processing means outputs the material to the recording/reproducing means within assigned time slot period, and the material is caused to be inputted from the recording/reproducing means, the data recording/reproducing apparatus comprising: information file preparing means for preparing information file relating to first position located forward with respect to editing period of the material and second position located backward with respect to the editing period; and control means for controlling the recording/reproducing means so as to reproduce the edited material from the first position to the second position on the basis of the information file prepared by the information file preparing means.

Further, this invention is directed to a data recording/reproducing method for providing access to material including video and/or sound data within assigned time slot period with respect to non-linearly accessible recording medium, wherein the material reproduced by accessing the material recorded with respect to the recording medium within the time slot period is caused to be inputted, the data recording/reproducing method including: a first step of recording the material; a second step of preparing information file relating to first position located forward with respect to editing period of the material and second position located backward with respect to the editing period, and a third step of reproducing the edited material from the first position to the second position on the basis of the information file.

BRIEF DESCRIPTION OF THE DRAWINGS

FIG. 5 is a view showing VFL prepared when edit data shown in FIG. 4 is generated.

FIG. 8 is a view for explaining a more practical example of information described in file entry (FE) and record entry (RE) in the file management information.

FIG. 9 is a view for explaining a more practical example of information described in Free Space List (FSL) in the file management information.

FIG. 10 is a view for explaining the configuration of Virtual File List (VFL) used in the A/V server to which this invention is applied.

BEST MODE FOR CARRYING OUT THE INVENTION

Best mode for carrying out the invention will now be described in detail with reference to the attached drawings.

Figure 1:
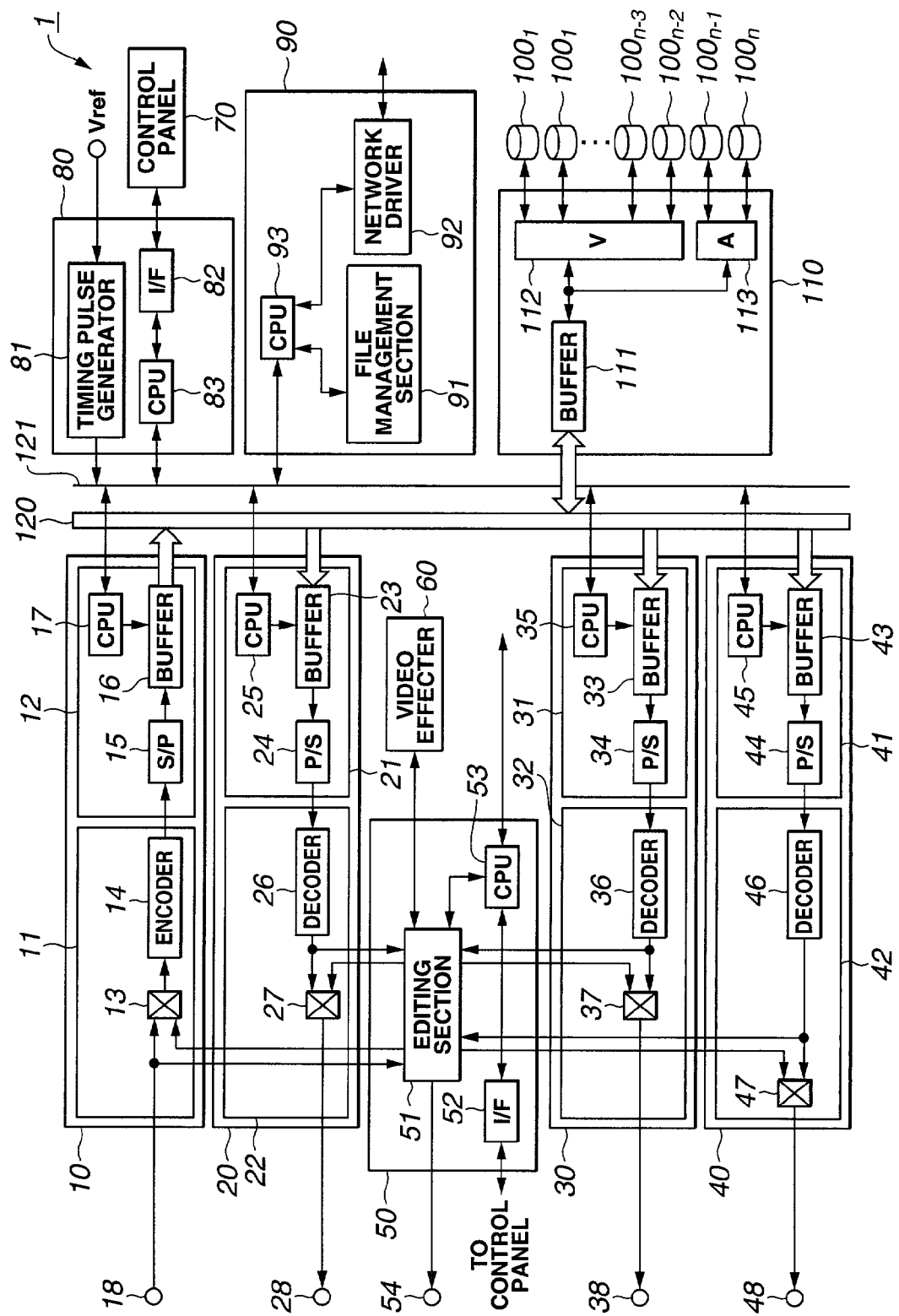
FIG. 1 is a block diagram showing the configuration of A/V server to which this invention is applied.

This invention is applied to, e.g, A/V (Audio/Video) server 1 constituted as shown in FIG. 1. This A/V server 1 records and/or reproduces (hereinafter referred to as records/reproduces) audio and/or video data (hereinafter referred to as A/V data) with respect to recording medium. This A/V server 1 can carry out editing processing in addition to recording/reproduction processing of A/V data by allowing user to operate the control panel.

The A/V server 1 comprises a recording port 10, reproduction ports 20, 30, 40, an editing manager 50, a video effecter 60, a control panel 70, a timing manager 80, a file manager 90, and a HDD 110 array including HDDs (Hard Disc Drives) $100_1$, $100_2$, ..., $100_{n-3}$, $100_{n-2}$, $100_{n-1}$, $100_n$ (n is arbitrary integer) respectively provided with plural recording media.

Moreover, the A/V server 1 comprises a data bus 120 for carrying out data transfer between the respective ports of the recording port 10 and the resproduction ports 20, 30, 40 and the HDD array 110, and a control bus 121 for transferring control signals for controlling respective sections. The A/V server 1 includes one input processing section and three output processing sections as described above, and is operative to carry out input/output processing of four systems.

The recording port 10 functions as input processing section which carries out processing for recording signals inputted from an input terminal 18 onto the HDD array 110, or the like. This recording port 10 is composed of a data input/output section 11 and a data management section 12. The data input/output section 11 comprises a selector 13 and an encoder 14, and the data management section 12 comprises a serial-to-parallel conversion processing section (hereinafter referred to as S/P) 15, a buffer 16 and a CPU 17.

The selector 13 serves to select data to be encoded. In more practical sense, the selector 13 selects, e.g., either one signal of data including video/audio data inputted from the input terminal 18 such as data in conformity with SDI (Serial Digital Interface) standardized by the SMPTE (Society of Motion Picture and Television Engineeers)-259M or data in conformity with SDTI (Serial Digital Transfer Interface) standardized by the SMPTE-305M, etc. and data outputted from an editing section 51 that the editing manager 50 has to output selected signal to the encoder 14 of the succeeding stage.

The encoder 14 encodes the signal outputted from the selector 13 into a signal having a predetermined format. In more practical sense, the encoder 14 carries out compression-encoding by the MPEG (Moving Picture Experts Group) system with respect to inputted signal. In this case, in the encoder 14, there may be employed, in addition to the compression encoding processing, an approach to convert signal into signal having format easy to be recorded onto HDDs $100_1$, $100_2$, ..., $100_{n-3}$, $100_{n-2}$, $100_{n-1}$, $100_n$ of the succeeding stage. For example, there may be carried out processing to extract video signals and/or audio signals from data in conformity with the above-described SDI. Further, in the encoder 14, there may be carried out processing to take out or extract video signals and/or audio signals from data in conformity with the above-described SDTI, and there may be carried out combination of the above-described processing. It is to be noted that, in the following description, the encoder 14 is assumed to undergo compression encoding of inputted signal to output it. The compressed data generated by compression-encoding of the encoder 14 is inputted to the S/P 15 in the data management section 12.

The S/P 15 in the data management section 12 carries out serial-to-parallel conversion so as to permit compressed data inputted from the encoder 14 to be written onto respective HDDs $100_1$, $100_2$, ..., $100_{n-3}$, $100_{n-2}$, $100_{n-1}$, $100_n$. Respective data obtained after undergone serial-to-parallel conversion by this S/P 15 are delivered to the buffer 16 of the succeeding stage as occasion demands.

The buffer 16 is used for temporarily storing respective data outputted from the S/P 15 to, e.g., send out respective data after undergone time division multiplexing. Although not shown, the buffer 16 is caused to be of configuration to individually hold respective data outputted from the S/P 15. The buffer 16 is supplied with respective data from the S/P 15 as occasion demands. When time slot from a timing pulse generator 81 is assigned to the CPU 17, the buffer 16 outputs data subject to buffering to the data bus 120 within a predetermined time period permitted by the time slot under control of the CPU 17.

In this case, the data bus 120 is called SBX (Spydar Bus extension) bus, and is separated, although not shown, into up-stream bus for carrying out transmission of data only in a direction to record data and down-stream bus for carrying out transmission of data in a direction to reproduce data, wherein these up-stream bus and down-stream bus are respectively constituted by plural buses for individually carrying out transmission of respective data which have been converted from serial data into parallel data at the S/P 15.

Namely, in the transmission format of the SBX bus, from the port 10 to the HDD array 110, transmission of synchronizing code is carried out in the state where command and A/V data are added thereto. From HDD array 110 to the reproduction ports 20, 30, 40, transmission of synchronizing code is carried out in the state where status with respect to command and A/V data are added. It is to be noted that it is not necessarily required that A/V data is added in all cases, but there may be the case where only command is added, or the case where only status is added. For this reason, respective data outputted from the buffer 16 are transmitted to the HDD array 110 through buses corresponding to respective data constituting the data bus 120. In addition, bus output processing section (not shown) is provided at the succeeding stage of the buffer 16, and commands, etc. for instructing writing onto, e.g., HDDs $100_1$, $100_2$, ..., $100_{n-3}$, $100_{n-2}$, $100_{n-1}$, $100_n$ are superimposed onto respective data outputted from the buffer 16 so as to become in conformity with transmission format of the data bus 120.

The CPU 17 controls respective sections of the recording port 10 on the basis of, e.g., control signals such as external command, etc. transmitted from control panel 70 through the control bus 121. Moreover, the CPU 17 transfers, as occasion demands, given control signal to CPU 53 that the editing manager 50 has. Further, the CPU 17 controls output of data held in the buffer 16 on the basis of time slot assigned by timing pulse generator 81.

Such recording port 10 can input video data and audio data of 4 channels or 8 channels.

Further, the reproduction port 20 functions as output processing section which carries out processing for outputting, to the external, data recorded on the HDD array 110, and is composed of a data management section 21 and a data input/output section 22.

The data management section 21 comprises a buffer 23, a parallel-to-serial conversion processing section (hereinafter referred to as P/S) 24 and a CPU 25, and the data input/output section 22 comprises a decoder 26 and a selector 27.

The buffer 23 temporarily stores respective data sent in parallel through the data bus 120 from the HDD array 110. The buffer 23 is constituted so as to individually hold respective data outputted in parallel from the HDD array 110 although not shown. The buffer 23 reads out, under control of the CPU 25, data from the HDD array 110 to input it. Namely, when data is read out from the HDD array 110 by the time slot, command to instruct reproduction by control of the CPU 17 is outputted from the buffer 16 to the HDD array 110 through the data bus 120 at a certain time slot period. Then, data is reproduced within the HDD array 110 at the subsequent time slot period. Thus, the reproduced data is outputted from the data bus 120 to buffers 23, 33, 34 in accordance with the above-described SBX format. By carrying out transmission of data on the basis of the assigned time slot as described above, it can be considered that recording/reproduction of data are carried out at the same time. Data inputted to the buffer 23 is caused to undergo buffering by this buffer 23, and is then delivered to the P/S 24 of the succeeding stage.

The P/S 24 converts parallel data outputted from the buffer 23 into serial data. The data obtained after undergone parallel-to-serial conversion by this P/S 24 is delivered to the decoder 26 in the data input/output section 22.

The CPU 25 controls respective sections of the reproduction port 20 on the basis of control signals such as external command, etc. transmitted through the control bus 121. In addition, the CPU 25 transfers given control signals to CPU 53 that the editing manager 50 has as occasion demands.

The decoder 26 in the data input/output section 22 decodes serial data inputted from the P/S 24 by a predetermined decode processing. This decoder 26 expands data reproduced from the respective HDDs 100 when they are compression-encoded to convert such data into the above-described SDI data, etc. to output them. Various data including video/audio data obtained as the result of the fact that they are decoded by this decoder 26 are inputted to selector 27 or editing section 51 that the editing manager 50 has.

The selector 27 serves to select signal which is outputted to the external through output terminal 28. In more practical sense, the selector 27 selects either one signal of data outputted from the decoder 26 and data outputted from the editing section 51 that the editing manager 50 has to deliver the selected signal to the output terminal 28 as SDI data or SDTI data.

Such reproduction port 20 can output video data and audio data of 4 channels or 8 channels.

Reproduction ports 30, 40 are both constituted similarly to the reproduction port 20.

Namely, the reproduction port 30 is composed of a data management section 31, and a data input/output section 32. The data management section 31 comprises a buffer 33 for temporarily storing data from the HDD array 110, a P/S 34 for converting parallel data from the buffer 33 into serial data, and a CPU 35 for controlling respective sections of the reproduction port 30. In addition, the data input/output section 32 comprises a decoder 36 for decoding serial data inputted from the P/S 34, and a selector 37 for selecting either one signal of data outputted from this decoder 36 and data outputted from the editing section 51 to deliver the selected signal to output terminal 38.

On the other hand, the reproduction port 40 is composed of a data management section 41 and a data input/output section 42. The data management section 41 comprises a buffer 43 for temporarily storing data from the HDD array 110, a P/S 44 for converting parallel data from this buffer 43 into serial data, and a CPU 45 for controlling respective sections of the reproduction port 40. In addition, the data input/output section 42 comprises a decoder 46 for decoding serial data inputted from the P/S 44, and a selector 47 for selecting either one signal of data outputted from this decoder 46 and data outputted from the editing section 51 to deliver the selected signal to output terminal 48.

The editing manager 50 comprises editing section 51, an interface (I/F) 52 and a CPU 53 and serves to output data inputted from the recording port 10 and the reproduction ports 20, 30, 40 which are described above to a video effector 60 through the editing section 51 to allow it to carry out editing. In addition, the editing manager 50 outputs data from the video effecter 60 to the selector 13 of the recording port 10 and the selectors 27, 37, 47 of the reproduction ports 20, 30, 40.

The editing section 51 suitably switches desired data of data inputted to the recording port 10 and data after passing through decoders 26, 36, 46 of the reproduction ports 20, 30, 40 by switcher (not shown) provided therewithin to select such desired data to output it to the video effecter 60. Moreover, the editing section 51 suitably switches data inputted from the video effecter 60 by switcher to thereby output it to desired port or CPU 53. Further, in the case where there is necessity to output, to external monitor unit, etc., data inputted to the recording port 10, data after passing through decoders 26, 36, 46 of the reproduction ports 20, 30, 40 and data inputted from the video effecter 60, the editing section 51 delivers such data to output terminal 54. It is to be noted that there are instances where switching is only carried out to output data to the reproduction ports 20, 30, 40 and the recording port 10, such as, for example, instances where material A is inserted into material B and is only outputted so that effect is not applied at the editing point.

The I/F 52 is connected to the control panel 70, and is supplied with control signal for controlling the control panel 70 and/or A/V data, etc. from CPU 53 to output it to the control panel 70, and to input, to the CPU 53, operation input signal, etc. from the control panel 70. In addition, the I/F 52 is connected to, e.g., external VTR (Video Tape Recorder), etc. to output data and/or various commands, and to input various commands from the external.

The CPU 53 executes editing processing execution program stored therein to thereby control the CPU 17 that the recording port 10 has and the CPUs 25, 35, 45 that the reproduction ports 20, 30, 40 respectively have.

Moreover, the CPU 53 controls CPUs of respective ports to thereby control plural ports at the same time, and to output, to the HDD array 110, control signal indicating read-out of A/V data stored in the respective HDDs 100 to input A/V data. At this time, the CPU 53 reads out material data subject to editing processing in accordance with Virtual File List (hereinafter referred to as VFL) to output it to the control panel 70 through the I/F 52. The detail of VFL will be described later.

Further, this CPU 53 carries out preview processing based on VFL generated as the result of editing processing in accordance with operation input signal indicating execution of preview processing from the control panel 70. At this time, the CPU 53 reads out VFL stored in a file management section 91 to read out A/V data that VFL indicates through respective ports 20 to 40 from respective HDDs 100 in sequence to output such data to the control panel 70 through the I/F 52.

Furthermore, this CPU 53 carries out VTR emulation processing when reproducing A/V data after undergone editing. Namely, when VTR emulation processing is carried out so that operation input signal indicating execution of display on a display section 301 of the control panel 70 is inputted, this CPU 53 sequentially reads out, on the basis of VFL, data from the preroll point positioned forward on the time axis with respect to in points set in respective material data subject to editing processing until postroll point positioned backward on the time axis with respect to the out points to output such data to the control panel 70 through the I/F 52. It is to be noted that time with respect to in point of the preroll point can be arbitrarily set, and time with respect to out point of the postroll point can be arbitrarily set.

In addition, when carrying out VTR emulation processing, this CPU 53 carries out processing to sequentially read out data from the preroll point until the postroll point in accordance with editing point set in respective material data thereafter to output data to the control panel 70 so as to display still picture positioned at the in point or out point set in respective data which have been read out, or processing to output, to the control panel 70, control signal to carry out Cue Up processing for displaying still picture positioned at in point or out point stored in a flash memory 304 of the control panel 70.

The video effecter 60 implements special effect processing to data by making use of plural ports 20 to 40. In more practical sense, the video effecter 60 carries out, with respect to material data inputted from the editing manager 50, processing for carrying out special effect processing such as Picture-in-Picture (PinP), etc. to insert other different material data into certain material data to connect respective material data to thereby generate new time series data.

The control panel 70 comprises, e.g., various switches, etc. that user operates when carrying out selection of data for carrying out editing work or selecting port for carrying out input/output of data, and display section, etc. for displaying picture, etc. used in editing work. The control panel 70 generates, as the result of the fact that it is operated by user, an operation input signal corresponding to that operation.

In more practical sense, the control panel 70 is adapted so that when user operates various switches, etc. to thereby select recording port 10, reproduction ports 20, 30, 40 and VTR connected to the external, etc., it outputs control signal to the selected port or VTR. This control signal is sent to control bus 121 through timing manager 80, and is caused to undergo transmission by the control bus 121. The control signal thus transmitted is inputted to CPUs that respective ports have. Respective ports or VTR to which control signal is sent carry out operation corresponding to the content of this control signal.

Figure 2:
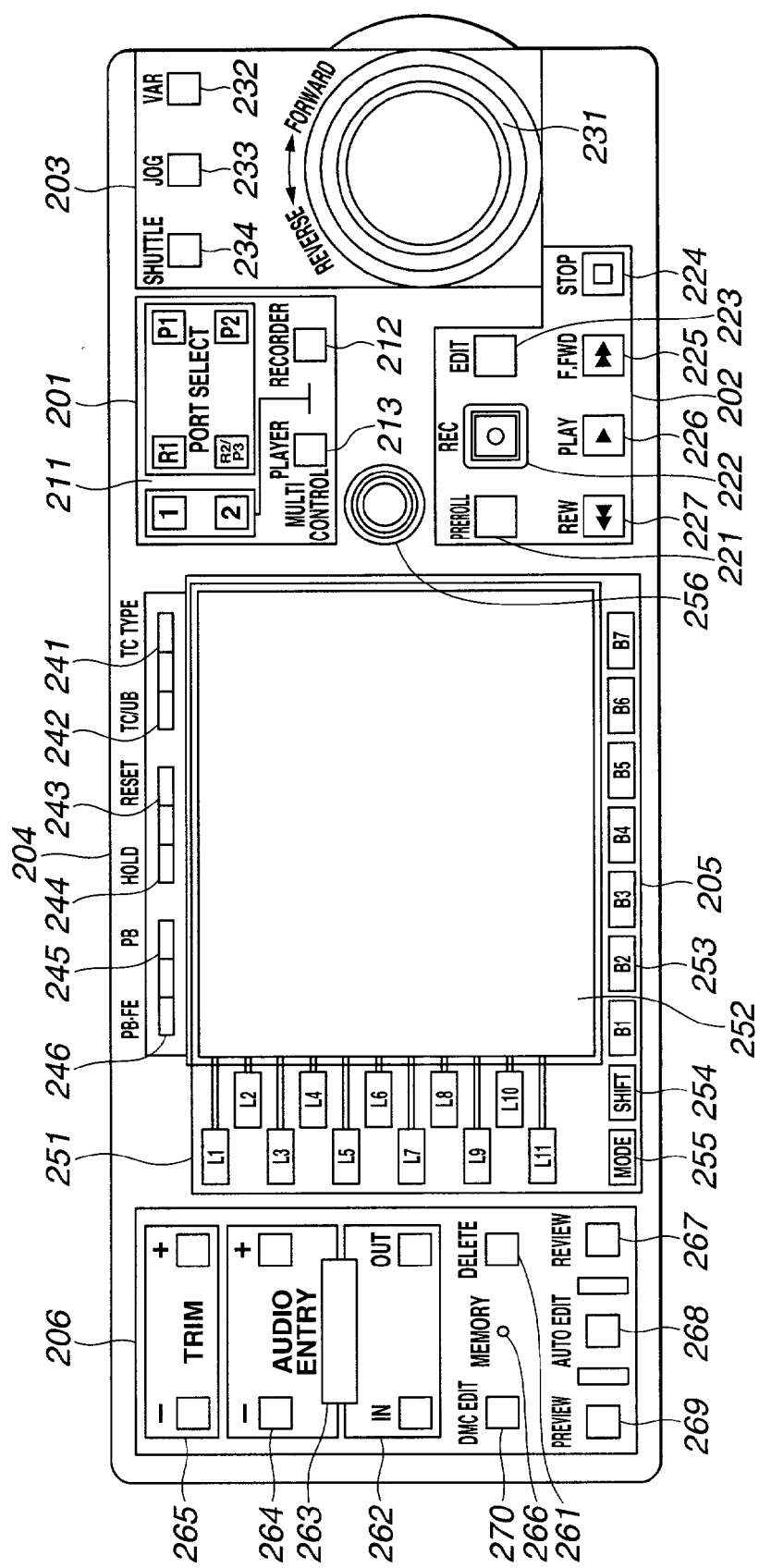
FIG. 2 is a front view of control panel provided at the A/V server to which this invention is applied.

As shown in FIG. 2, the control panel 70 comprises plural buttons, etc. operated by user, and is roughly classified into a port select section 201, a traveling control section 202, a search operation section 203, a time code section 204, a function operation and display section 205 and an editing operation section 206.

This port select section 201 is the section in which there are provided a group of buttons for allowing user to select recording port 10 and reproduction ports 20, 30, 40, and comprises a port select button (PORT SELECT) 211 for selecting respective ports 10, 20, 30, 40, a recorder button (RECORDER) 212 for selecting ports 10, 20, 30, 40 caused to function as data input port at the time of editing processing, and a player button (PLAYER) 213 for selecting ports 10, 20, 30, 40 caused to function as data output port at the time of editing processing.

The travelling control section 202 is the section in which there are provided a group of buttons for allowing user to control recording/reproduction processing, and comprises a preroll button (PREROLL) 221 for implementing VTR emulation processing to carry out reproduction, a recording button (REC) 222 for atarting recording, an editing button (EDIT) 223 for carrying out editing processing, a stop button (STOP) 224 for stopping recording and reproduction, a fast feed button (F FWD) 225 for executing fast feed in the forward direction of the time axis, a play button (PLAY) 226 for starting reproduction, and a rewinding button (REW) 227 for executing rewinding in reverse direction of the time axis.

The search operation section 203 is the operation section that user controls retrieval processing of material data, and comprises a search dial 231 for retrieving editing points (in point, out point) at the time of editing processing, a variable button (VAR) 232 for carrying out variable mode reproduction to control reproduction speed (velocity) in dependency upon position of the search dial 231, a jog button (JOG) 233 for carrying out jog mode reproduction to control reproduction speed (velocity) in dependency upon rotational speed (velocity) of the search dial 231, and a shuttle button (SHUTTLE) 234 for carrying out shuttle mode reproduction to control reproduction speed (velocity) in a range broader that of the jog mode reproduction in dependency upon rotational speed (velocity) of the search dial 231.

The time code section 204 comprises, as buttons that user controls in regard to time code, a time code display switching button (TC TYPE) 241 for switching time code display, a time code/user bit button (TC/UB) 242 for displaying user bit or bits inserted into time codes of selected ports 10, 20, 30, 40, a reset button (RESET) 243 for resetting time code in dependency upon kind of time code, a hold button (HOLD) 244 for controlling display of time code dialog, a reproduction (playback) signal monitor button (PB) 245 for selecting reproduction signal as A/V data outputted from respective ports 10, 20, 30, 40, and an input signal monitor button (PB.FE) 246 for selecting input of predetermined mode as video/audio signal outputted from respective ports 10, 20, 30, 40.

The function operation and display section 205 comprises function buttons (L1 to L11) 251 for executing respective functions in correspondence with functions displayed on display, a display section 252, function buttons (B1 to B7) 253, a shift button (SHIFT) 254 for switching function assignment every function buttons 251, 253, a mode button (MODE) 255 for designating operation mode, and a multi-control (MULTI CONTROL) knob 256 for carrying out cursor movement, etc. displayed on the display section 252.

The editing operation section 206 comprises a delete button (DELETE) 261 for carrying out deletion of already set editing point and release of DMC mode, an editing in/out point designation button (IN/OUT) 262 for setting in point and out point, an editing point setting button (ENTRY) 263 for setting in point and out point along with the editing in/out point designation button 262, an audio in point/out point designation button (AUDIO IN/OUT) 264 for setting in point and out point with respect to audio data, a trimmer button (TRIM) 265 for trimming already set in point and out point, a memory lamp (MEMORY) 266 which is turned ON when reproduction processing setting at an arbitrary reproduction speed (velocity) is stored, a review button (REVIEW) 267 for displaying reproduction of A/V data after undergone editing processing, an automatic editing button (AUTO EDIT) 268 for carrying out automatic editing, a preview button (PREVIEW) 269 for carrying out preview reproduction of editing processed A/V data before recording, and a DMC editing button (DMC EDIT) 270 for executing automatic reproduction and automatic editing at an arbitrary reproduction speed (velocity).

Figure 3:
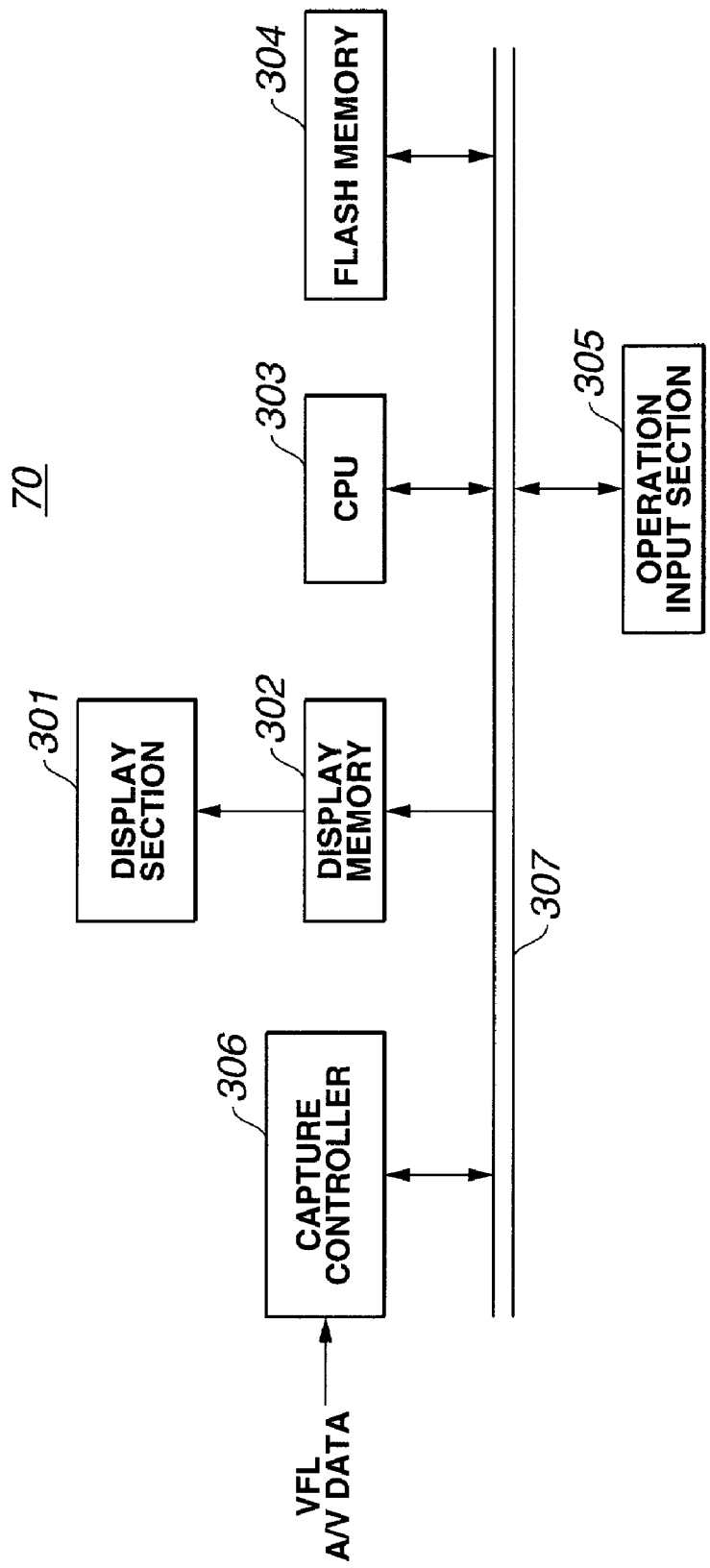
FIG. 3 is a block diagram showing the configuration of the control panel provided at the A/V server to which this invention is applied.

In this control panel 70, as shown in FIG. 3, display section 301, display memory 302, CPU 303, flash memory 304, operation input section 305 and capture controller 306 are connected to bus 307, and the respective sections are adapted so that input/output of data can be made through the bus 307.

The display section 301 corresponds to the above-described display section 252, and is comprised of, e.g., LCD (Liquid Crystal Display) and serves to read thereinto A/V data stored in the display memory 302 to display image that A/V data such as moving picture or still picture, etc. indicates.

The operation input section 305 includes the above-described various buttons or search dial 231, etc. that user operates, and is adapted so that button, etc. is caused to undergo pressing operation by user, it generates operation input signal corresponding to each button to output it to the CPU 303 and the capture controller 306.

The capture controller 306 is supplied with A/V data from information management section 3 through data bus 120 and network driver 92, and carries out processing to capture inputted A/V data to generate still picture data to output the still picture data thus generated to the flash memory 304.

The CPU 303 is adapted to store processing program in the memory included therewithin, and carries out processing in accordance with the processing program. This CPU 303 displays file names, etc. stored in respective HDDs 100.

Figure 4:
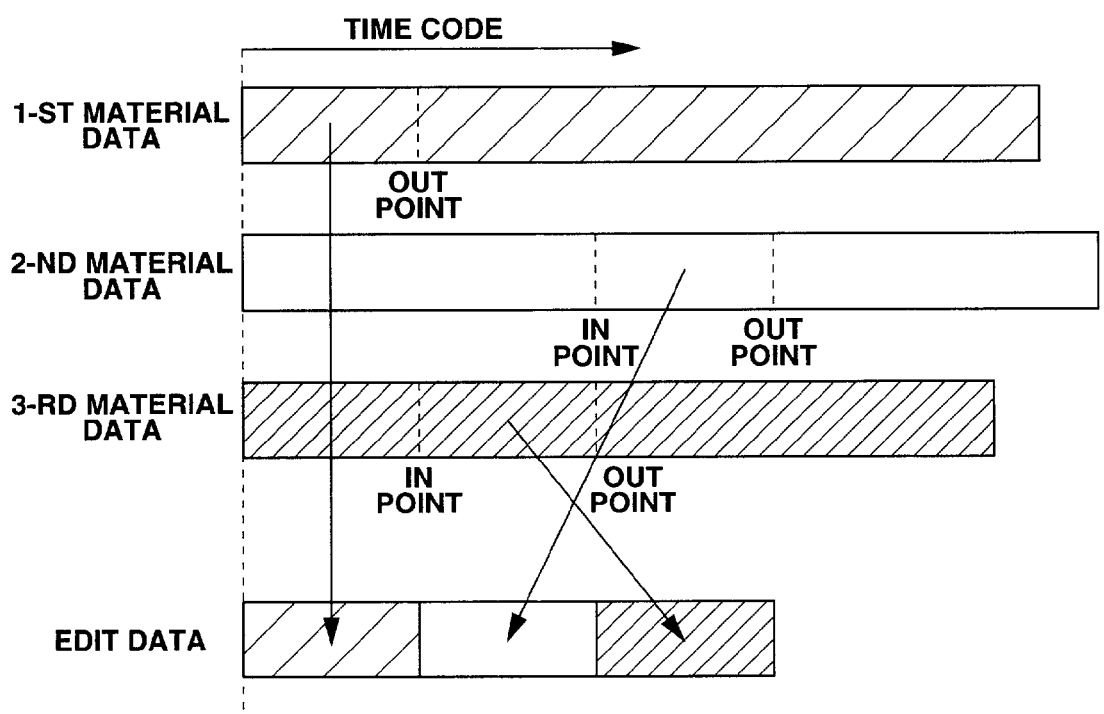
FIG. 4 is a view for explaining that edit data is generated by using first to third material data by the A/V server to which this invention is applied.

In addition, this CPU 303 sets out point in the first material data and sets in point and out point in the second and third material data in accordance with an operation input signal corresponding to the fact that user operates editing operation section 206 when generating edit data in which the first to third material data are connected as shown in FIG. 4 by using, e.g., first to third material data subject to editing processing to thereby prepare VFL in which the in point and the out point set in the respective material data are described by time codes as shown in FIG. 5.

As shown in this FIG. 5, the CPU 303 prepares VFL consisting of name of VFL, in points and out points of the first to third material data indicating image, and in points and out points of the first to third material data indicating sound. With respect to the edit data reproduced by VFL, A/V data from 0 to 5 seconds of the first material data is reproduced, A/V data from 10 to 15 seconds of the second material data is subsequently reproduced, and A/V data from 5 to 10 seconds of the third material data is reproduced.

Timing manager 80 serves to take timing on the basis of synchronizing signal of video to carry out management of data bus 120. This timing manager 80 comprises a timing pulse generator 81 for generating timing pulse, interface (I/F) 82 which is interface with the control panel 70, and CPU 83 for controlling respective sections.

This timing manager 80 allows CPU 83 to control timing pulse generator 81 to generate timing pulse on the basis of video synchronizing signal inputted from the external to transmit it to control bus 121. The timing manager 80 carries out management of use right of the data bus 120 on the basis of this timing pulse.

A file manager 90 comprises a file management section 91 for holding file management information indicating recording areas of files on respective HDDs 100 to carry out management of file on the basis of this file management information, a network driver 92 connected to external network, e.g., ethernet, etc. to carry out input/output of data between the network driver and external network, and a CPU 93 for controlling respective sections.

The file manager 90 carries out management of data recorded on the HDD array 110 under control of the CPU 93. For example, when a certain file is recorded onto HDD, the file manager 90 carries out management of data recorded on the HDD array 110 by using file management information including information indicating address in which file is recorded within each HDD 100.

Moreover, the file management section 91 can hold file management information to thereby only designate file name to carry out reproduction of desired file, and can reproduce material data in accordance with editing result without newly recording data in editing on the basis of VFL which is reproduction file information.

File management information for carrying out management of file stored on the HDD array 110 will now be described in detail.

As shown in FIG. 6, the file management information consists of three information of File Entry (hereinafter referred to as FE), Record Entry (hereinafter referred to as RE) and Free Space List (hereinafter referred to as FSL).

Figures 6A, 6B, 6C, 7:
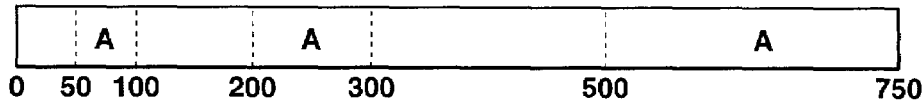
FIGS. 6(A), 6(B) and 6(C) are views for explaining the content of file management information that file management section of the A/V server to which this invention is applied holds.
FIG. 7 is a view for explaining the state where arbitrary file A is recorded in address area on HDD that the A/V server to which this invention is applied has.

Into the FE, as shown in FIG. 6(A), there are written file name, pointer information to the first RE, start time information (start time code) in which actual time st which file is recorded or "0" is described, and ancillary information such as maker (producer) or production date, etc. Namely, A/V server 1 is adapted so that FEs are set in file units, and are linked to RE indicating information which indicates position on HDD 100 on which that file is written and written length thereof.

Into the RE, as shown in FIG. 6(B), there are written pointer information to the next RE, leading position data indicating addresses of the leading positions on respective HDDs 100 where files are actually recorded, and continuous area length data indicating length in which files are continuously recorded from address indicating leading position.

Explanation will be given in connection with the case where arbitrary files A are recorded into address areas on respective HDDs 100 as shown in FIG. 7 as a more practical example of information described in this RE.

Namely, file A is recorded in a manner divided into address 50 to address 100, address 200 to address 300, and address 500 to address 750 in address space on the HDD 100.

At this time, information as shown in FIG. 8 is described in the FE and the RE. Namely, into the FE, "A" is described as file name and pointer information to the first RE is described. It is to be noted that while start time information (start time code) in which actual time at which file A is recorded is described and ancillary information such as maker (producer) and/or production date, etc. are described, such information are omitted here. Moreover, REs are prepared by the same number as the number of divisions of the file A. Into the first RE, "50" which is the first address where file A is recorded on HDD is described as leading position data, and "50" is described as recording length of continuous area because file A is recorded in address 50 to address 100. Further, into the next RE, "200" is described as leading position data, and "100" is described as recording length of continuous area because file A is recorded in address 200 to address 300. Further, into the next RE, "500" is described as leading position data, and "250" is described as recording length of continuous area because file A is recorded in address 500 to address 750. In addition, into this RE, EOF (End Of File) is described as pointer information to the next RE for the purpose of indicating that file A has been completed.

These FE and RE are information indicating area recorded on HDD of data, and FSL is adapted so that information indicating area where no data is written is described therein. As shown in FIG. 6(C), FSL includes pointer information to the next FSL, leading position data indicating address of leading position of continuous space area on the HDD 100 where no data is recorded, and a continuous area length indicating length of space area from address of this leading position until the area where data is next recorded. Explanation will be given in connection with the case shown in FIG. 7 as a more practical example of information described in this FSL At this time, information as shown in FIG. 9 is described into the FSL. Namely, FSLs are prepared by the same number as the number of continuous space areas. Into the first FSL, "0" which is the first address of the space area on the HDD is described as leading position data, and "50" is described as continuous area length because file A is recorded from address 50. Moreover, into the next FSL, "100" is described as leading position data, and "100" is described as continuous area length because file A is recorded from address 200. Further, into the next FSL, "300" is described as leading position data, and "200" is described as continuous area length because file A is recorded from address 500. In addition, into the FSL, EOF (End Of File) is described as pointer information to the next FSL for the purpose of indicating that corresponding area is the last space area.

The file management section 91 holds such file management information and is adapted so that when other file is recorded onto $HDD_1$, $HDD_2$, . . . , $100_{n-3}$, $100_{n-2}$, $100_{n-1}$, $100_n$, it prepares FE and RE relating to that file to rewrite FSL.

The A/V server 1 which holds such file management information is operative so that when editing, as material data, A/V data recorded on HDD $100_1$, $100_2$, . . . , $100_{n-3}$, $100_{n-2}$, $100_{n-1}$, $100_n$ to output information indicating that file from the control panel 70 to the HDD array 110. The CPU 53 of the editing manager 50 can grasp area to be accessed of HDD $100_1$, $100_2$, . . . , $100_{n-3}$, $100_{n-2}$, $100_{n-1}$, $100_n$ for the purpose of reproducing desired file on the basis of file management information. User determines information of editing point, etc., such as, for example, in point and out point by operating various switches, etc. on the basis of information displayed on the display section of the control panel 70. Further, the A/V server 1 outputs editing result information determined in this way from the control panel 70 to the HDD array 110 for a second time. At this time, in the A/V server 1, it is sufficient to output only editing result information from the control panel 70 to the HDD array 110 and it is unnecessary to send material data itself.

Returning to FIG. 1, the HDD array 110 stores various data with respect to respective HDDs and carries out management thereof. The HDD array 110 is adapted so that there are connected plural HDDs, $100_1$, $100_2$, . . . , $100_{n-3}$, $100_{n-2}$, $100_n$, and stores various data with respect to these HDDs $100_1$, $100_2$, . . . , $100_{n-3}$, $100_{n-2}$, $100_{n-1}$, $100_n$ and carries out management of data stored in these HDDs $100_1$, $100_2$, . . . , $100_{n-3}$, $100_{n-2}$, $100_{n-1}$, $100_n$. The HDD array 110 comprises a buffer 111, a video data write/read processing section (V) 112, and an audio data write/read processing section (A) 113.

The buffer 111 temporarily stores data when carrying out transfer of data n between the buffer 111 and the data bus 120. For example, data from the respective HDDs 100 are caused to undergo buffering at this buffer 111, and is then outputted to the data bus 120.

The video data write/read processing section 112 carries out write and read processing of video data with respect to the respective HDDs 100 connected thereto. In more practical sense, the video data write/read processing section 112 selects desired HDD 100 from the respective HDDs to write video data inputted from the buffer 111 and to read out video data from the desired HDD to output it to the buffer 111.

The audio data write/read processing section 113 carries out write and read processing of audio data with respect to the respective HDDs $100_{n-1}$, $100_n$ connected thereto. In more practical sense, the audio data write/read processing section 113 selects either one of two HDDs $100_{n-1}$, $100_n$ connected thereto to write audio data inputted from the buffer 111, and to read audio data from the desired HDD 100 to output it to the buffer 111.

The HDD array 110 is caused to have redundancy such that, e.g., data to be recorded as broadcast business is sec n urely recorded and data recorded is securely reproduced, and takes RAID (Redundant Arrays of Inexpensive Disks) configuration. HDDs $100_1$, $100_2$, . . . , $100_{n-3}$, $100_{n-2}$ onto which video data is recorded is caused to be of configuration of RAID-3, i.e., configuration in which data are transferred in parallel in a manner divided into plural discs and parity disc is further provided. HDD $100_{n-1}$, $100_n$ onto which audio data is recorded takes configuration of RAID-1 so called mirror disc to carry out double write operation of data.

Processing when data inputted from the external are recorded onto respective HDDs 100 by A/V server 1 having the above-described configuration will now be described.

In the A/V server 1, data inputted to the input terminal 18 is inputted to the encoder 14 via the selector 13 that the data input/output section 11 of the recording port 10 has so that such data is encoded into data of a predetermined format. The encoded data is converted into parallel data by the S/P 15 that the data management section 12 of the recording port 10 has, and is caused to undergo buffering at the buffer 16. Further, the data which has been caused to undergo buffering is outputted to the data bus 120 for a time period of time slot assigned to the CPU 17 from the timing pulse generator 81, and is transferred to the HDD array 110.

The data transferred to the HDD array 110 is caused to undergo buffering at the buffer 111, and is read out therefrom. Further, among the data which have been read out from the buffer 111, video data is inputted to the video data write/read processing section 112 and audio data is inputted to the audio data write/read processing section 113. The video data write/read processing section 112 divides the inputted video data in predetermined units, and determines parity data to record the divided data and the parity data onto respective HDDs $100_1$, $100_2$, ..., $100_{n-3}$, $100_{n-2}$. In addition, the audio data write/read processing section 113 records the inputted audio data onto two HDDs $100_{n-1}$, $100_n$. At this time, the file management section 91 generates new file management information consisting of file names and addresses of recording areas of respective HDDs 100 where data are recorded in accordance with the recorded data.

The A/V server 1 carries out such a processing, thereby making it possible to record data inputted from the external onto the HDD array 110.

Processing when data recorded on the respective HDDs 100 are reproduced by the A/V server 1 to output them to respective reproduction ports 20 to 40 will now be described.

Namely, in the A/V server 1, one of the reproduction ports 20, 30, 40 provides access to the HDD array 110 at time period of time slot assigned by the timing pulse generator 81 to make a request for reproduction of data with respect to the HDD array 110. In the HDD array 110, the video data write/read processing section 112 reads out video data and parity data recorded, in a divided manner, on HDDs $100_1$, $100_2$, ..., $100_{n-3}$, $100_{n-2}$ to unify (integrate) the divided data, and to carry out error detection and error correction on the basis of parity data to reproduce video data. Moreover, the audio data write/read processing section 113 reproduces audio data from the HDD where there is no error of two HDDs $100_{n-1}$, $100_n$. At this time, the video data write/read processing section 112 and the audio data write/read processing section 113 access file to be reproduced by making reference to file management information stored on respective HDDs 100 or the file management section 91. The reproduced video/audio data is read out after undergone buffering at the buffer 111 and is read out therefrom. The data thus read out is transferred to reproduction port which has carried out reproduction request through the data bus 120.

In such reproduction processing by the A/V server 1, when, e.g., reproduction port 20 makes a reproduction request, data outputted from the HDD array 110 is inputted to the buffer 23 that the data management section 21 has through the data bus 120. The data inputted to the buffer 23 is converted into serial data at the P/S 24 after undergone buffering at this buffer 23. Such serial data is inputted to the decoder 26 that the data input/output section 22 has, at which it is decoded. Then, the data thus decoded is delivered to the output terminal 28 via the selector 27, and is outputted to the external. In a manner stated above, the A/V server 1 can reproduce internal material to output it to the external.

Editing processing using data inputted from the external and/or material data recorded on the respective HDDs by the A/V server 1 will now be described.

When carrying out editing processing by the A/V server 1, editing processing is started in accordance with operation input signal obtained as the result of the fact that various buttons provided at the front face of the control panel 70 are operated by user. At this time, CPU 303 of the control panel 70 sets, as editing points, in point which is editing start time information and out point which is editing end time information at respective material data subject to editing processing to thereby execute editing processing.

Moreover, the A/V server 1 holds file management information that the above-described file management section 91 carries out management, thereby making it possible to carry out operation such as reproduction, etc. of file only by designating file name. Thus, the A/V server 1 can reproduce internal material in accordance with editing result without newly recording data in editing on the basis of VFL.

The editing result information is called the above-described VFL. The A/V server 1 provides access to predetermined addresses of respective HDDs on the basis of the above-mentioned VFL to sequentially read out recorded material data, thereby making it possible to output edit data based on VFL to the control panel 70 to present it to user. Namely, there is no necessity that when carrying out editing processing, edit data serving as editing result are re-recorded onto respective HDDs 100. For this reason, the A/V server 1 can edit material data on the real time basis to output such data.

The detail of the VFL will now be described.

As shown in FIG. 10, the VFL consists of a file name area indicating edited file name, and a reproduction start position area and a reproduction end position area respectively indicating in point and out point set with respect to material data included in that file. The reproduction start position area and the reproduction end position area respectively indicate reproduction start position and reproduction end position corresponding to addresses on the HDD from the leading position of that file. For example, in the case where VFL which designates reproduction start position [10] and reproduction end position [60] is prepared as shown in FIG. 11(A) with respect to file A recorded, in a manner divided into three areas of address 50 to address 100, address 200 to address 300 and address 500 to address 750 in address space on the above-described HDD shown in FIG. 7, correspondence of actual reproduction start position and reproduction end position on the HDD is as shown in FIG. 11(B).

Figures 11A, 11B:
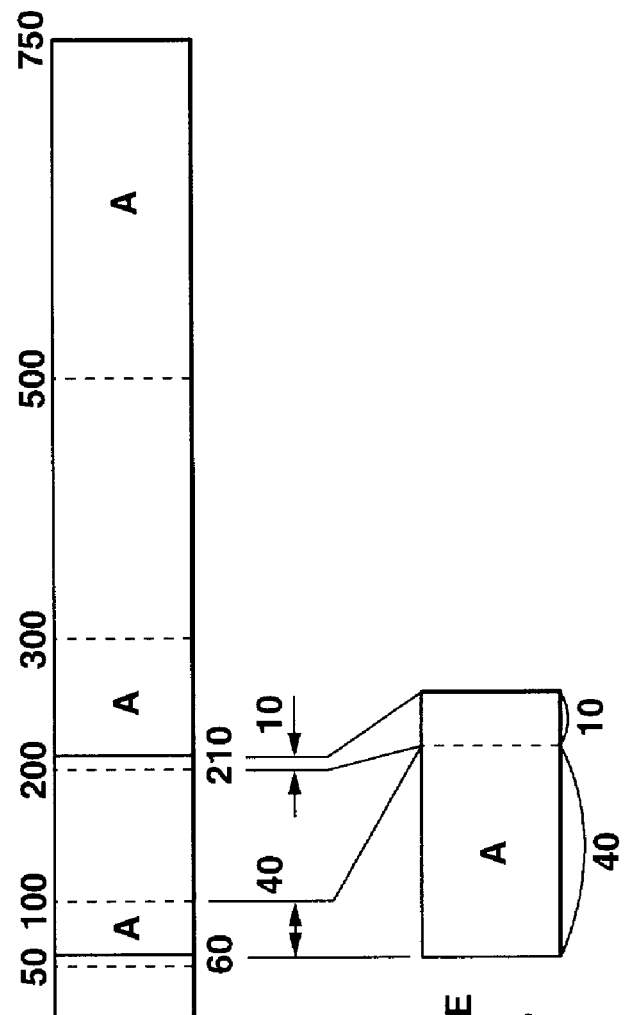
FIGS. 11(A) and 11(B) are views for explaining a more practical example of the VFL.

The VFL shown in FIG. 11(A) designates editing period of length [50] indicated by reproduction start position [10] and reproduction end position [60] with respect to the file A. As shown in FIG. 11(B), the file A is recorded from address 50 in address space on the HDD. Accordingly, start position of editing period, i.e., in point of file A given by the reproduction start position [10] indicated at VFL is address 60 in which "10" is added to the address 50. In addition, reproduction end position [60] indicated at the VFL indicates end position of editing period, i.e., out point of continuous length [50] from reproduction start position [10] (address 60) on the address space, and is address 210 which corresponds to end position of editing period of address 60 to address 100 and address 200 to address 210.

Namely, the VFL shown in FIG. 11(A) designates address 60 to address 100 and address 200 to address 210 as editing period of continuous file A.

Figure 12:
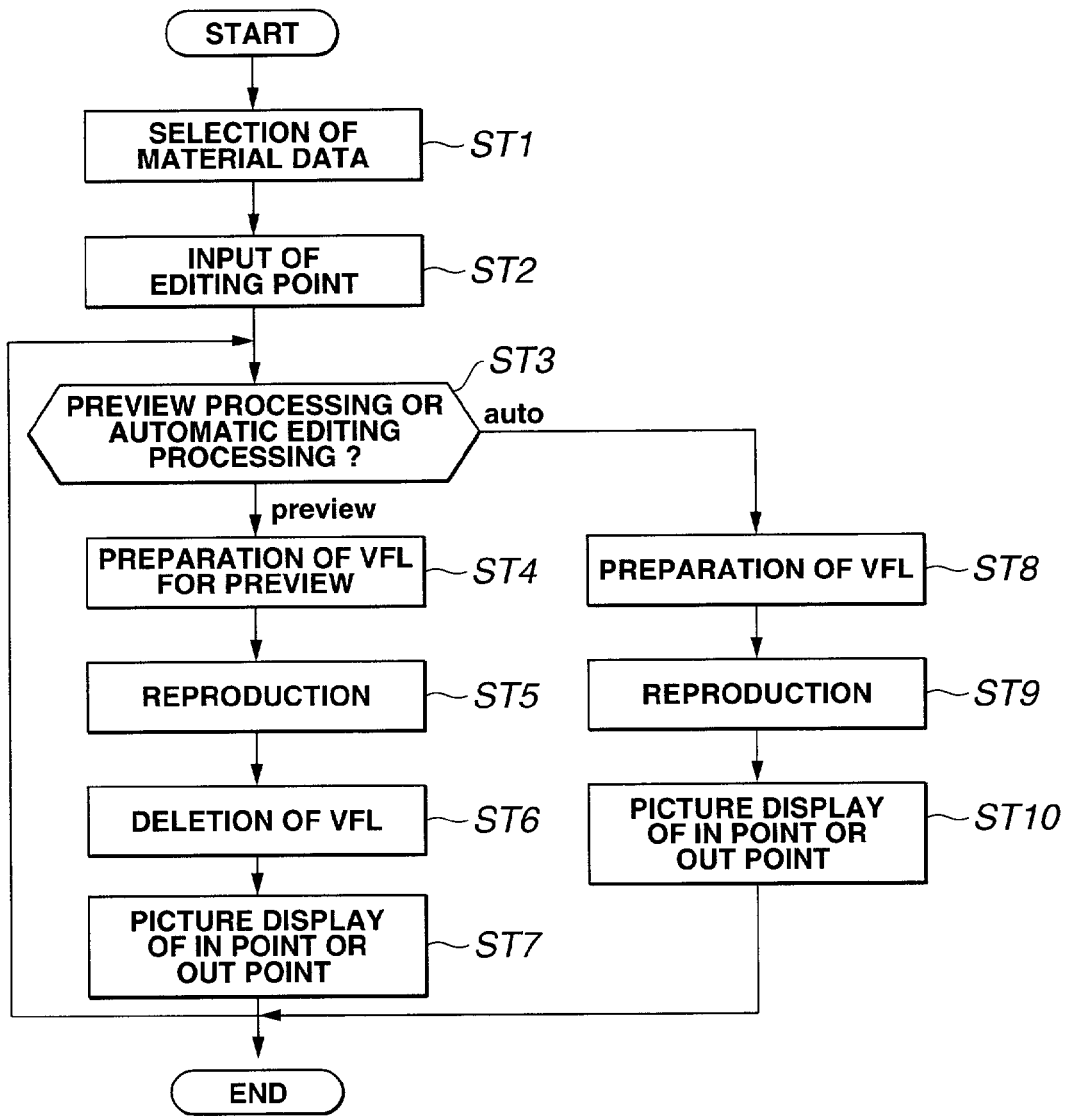
FIG. 12 is a flowchart when preview processing or automatic editing processing is carried out by the A/V server to which this invention is applied.

Preview processing and automatic editing processing for displaying image based on VFL on display section 301 of the control panel 70 to carry out confirmation of editing material or determination of editing will now be described with reference to the flowchart of FIG. 12.

When editing processing is carried out by the A/V server 1, initially, at step ST1, user operates the port select button 211 of the port select section 201 so that operation input signal is inputted to the CPU 53 of the editing manager 50 through the timing manager 80 and the control bus 121. Responding thereto, the CPU 53 selects A/V data inputted from the recording port 10 as second material data (A/V data of the Recorder side).

In addition, at this step ST1, user further operates the port select button 211 of the port select portion 201 so that operation input signal is inputted to the CPU 53. Thus, the CPU 53 reads out A/V data stored on the HDD 100 by making reference to file management information held at the file management section 91 to select this A/V data as first material data (A/V data of the Player side).

Figure 13:
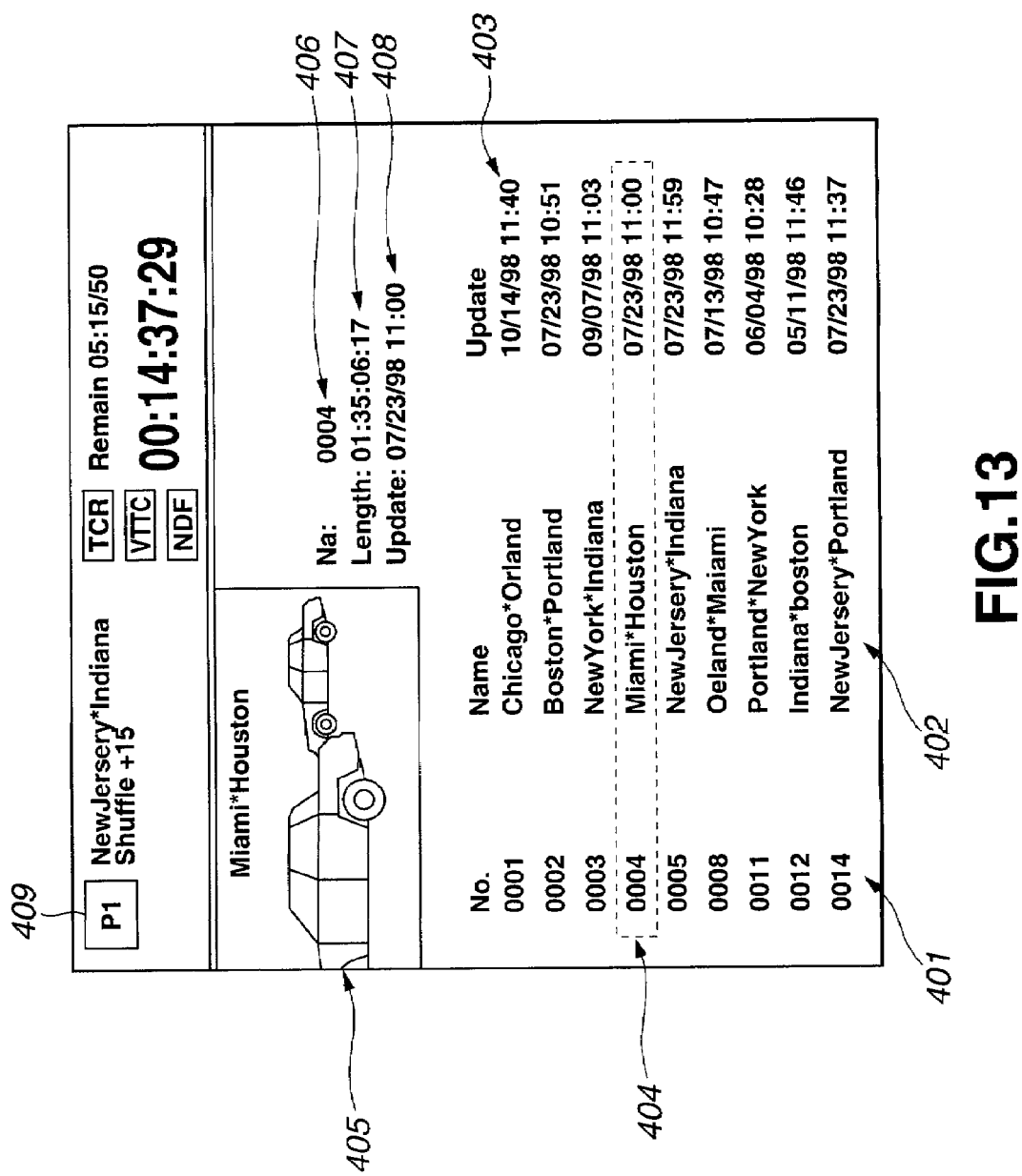
FIG. 13 is a view for explaining data retrieval picture displayed on control panel of the A/V server to which this invention is applied when material data is selected.

At this time, the CPU 303 of the control panel 70 carries out processing to display, on the display section 301, data retrieval picture as shown in FIG. 13 in accordance with control signal indicating execution of editing processing from the CPU 53. As shown in this FIG. 13, the CPU 303 displays No. of file 401 stored in each HDD 100 as file, file name 402, latest updating date 403, select/non-select pointer 404, picture 405 that material data stored in selected file indicates, No. of selected file 406, time length 407 of selected file, latest updating date 408 of selected file, and port No. 409 of designated each port. In addition, the CPU 303 serves to move the select/non-select pointer 404 by operation input signal corresponding to the fact that user operates search dial 231 to select first material data.

Figure 14:
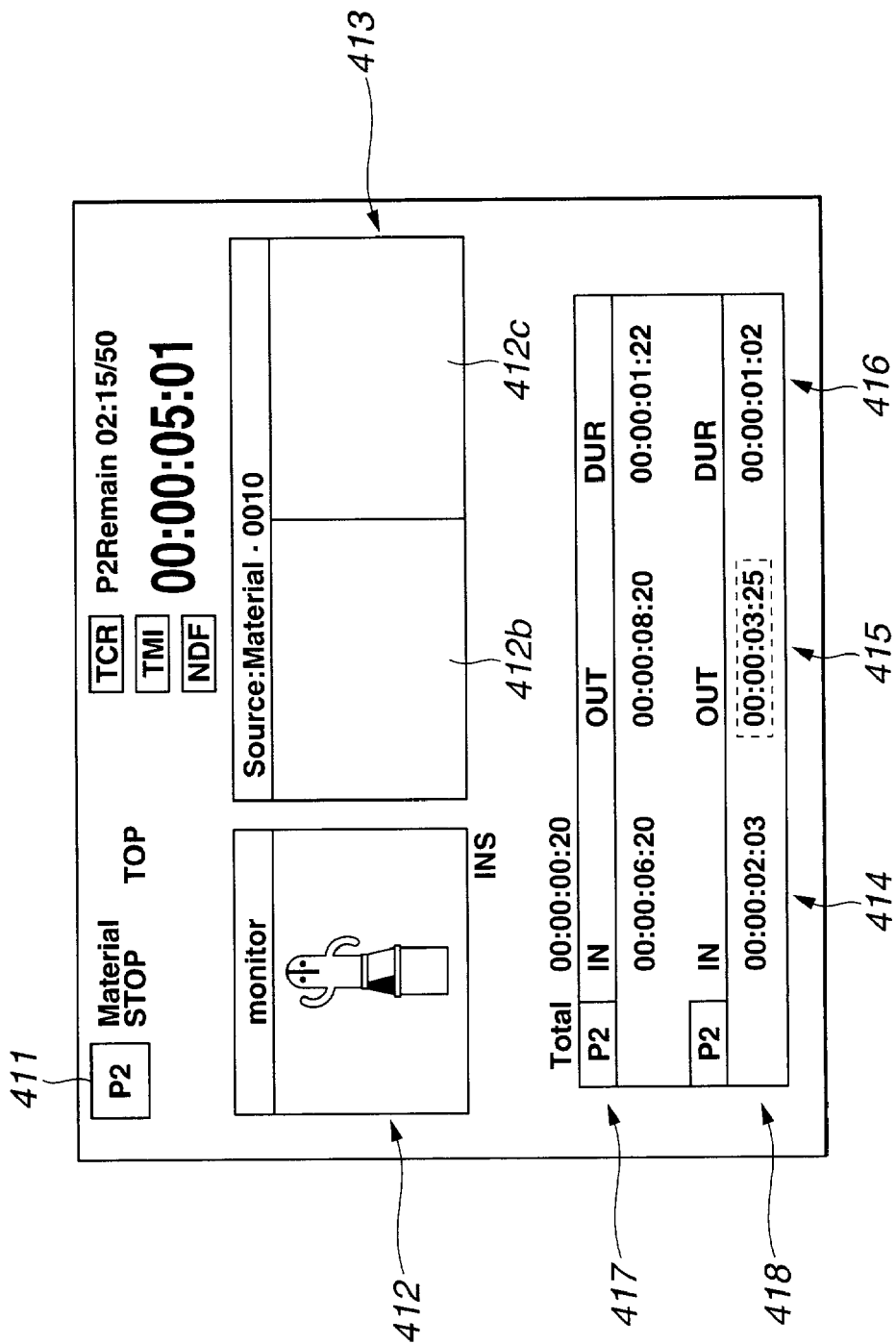
FIG. 14 is a view for explaining editing processing picture displayed on the control panel of the A/V server to which this invention is applied when in point and out point are set.

Further, when first material data and second material data are selected at step ST1, the CPU 53 serves to shift to processing for setting editing point of step ST2 to output an operation input signal to the effect that corresponding picture is caused to be editing processing picture to the CPU 303 of the control panel 70. Responding to this, the CPU 303 allows the display section 301 to display editing processing picture as shown in FIG. 14. As shown in FIG. 14, the CPU 303 displays port No. 411 for holding material data in which in point and out point are set, picture display area 413 including moving picture 412 of first material data or second material data, and still pictures 412b, 412c of first material data and second material data in which in point and out point are set, time code 414 of in point set at material data that set port holds, time code 415 of out point, time code 416 indicating time between in point and out point, time code 417 of first material data, and time code 418 of second material data.

At step ST2, editing processing picture as shown in FIG. 14 is displayed, and user operates the control panel 70 so that editing periods are designated every respective material data. In this example, preroll period and postroll period are stored in advance into flash memory 304 by operation of the control panel 70. The CPU 303 of the control panel 70 generates time code of in point and time code of out point indicating editing periods designated with respect to the first and second material data, and calculates respective positions of preroll point and postroll point from the time codes of in point and out point to output, to the file management section 91, the time code of in point and the time code of out point with respect to respective material data. In more practical sense, the CPU 303 subtracts time corresponding to preroll period, which has been read out from the memory 304, from time code of designated in point to thereby calculate preroll point, and adds time corresponding to postroll period to time code of out point to thereby calculate postroll point. Information of the calculated preroll and postroll points are transferred to the CPU 53 of the editing manager 50 via I/F 82 and CPU 83 of the timing manager 80 and the control bus 121. In addition, at step ST2, the CPU 303 of the control panel 70 allows automatic editing button 268 to undergo flashing to carry out display to the effect that in point and out point are set at first and second material data so that editing processing can be made.

At the subsequent step ST3, the CPU 53 judges operation input signal indicating that preview button 269 or automatic editing button 268 of the control panel 70 has been operated. Further, when the preview button 269 is pushed down, the processing procedure proceeds to step ST4 to carry out preview reproduction processing. When the automatic editing button 268 is pushed down, the processing procedure proceeds to step ST8 to carry out automatic editing processing.

In the preview reproduction processing, the CPU 53 prepares VFL for preview to sequentially reproduce data from the preroll point to the postroll point in accordance with editing points set at respective material data on the basis of this VFL for preview.

Namely, at step ST4, the CPU 53 carries out processing to convert time codes indicating in points and out points every respective material data set at the above-described step ST2 into addresses within the HDD to thereby control the file management section 91 so as to prepare VFL for preview having data structure as shown in FIG. 10 every respective material data.

At the subsequent step ST5, the CPU 53 reproduces areas including editing points (in point and out point) of respective material data by using VFL for preview prepared at the above-described step ST4 to output them to the control panel 70 to allow the display section 301 to display image based on VFL for preview to thereby carry out preview reproduction.

Figure 15:
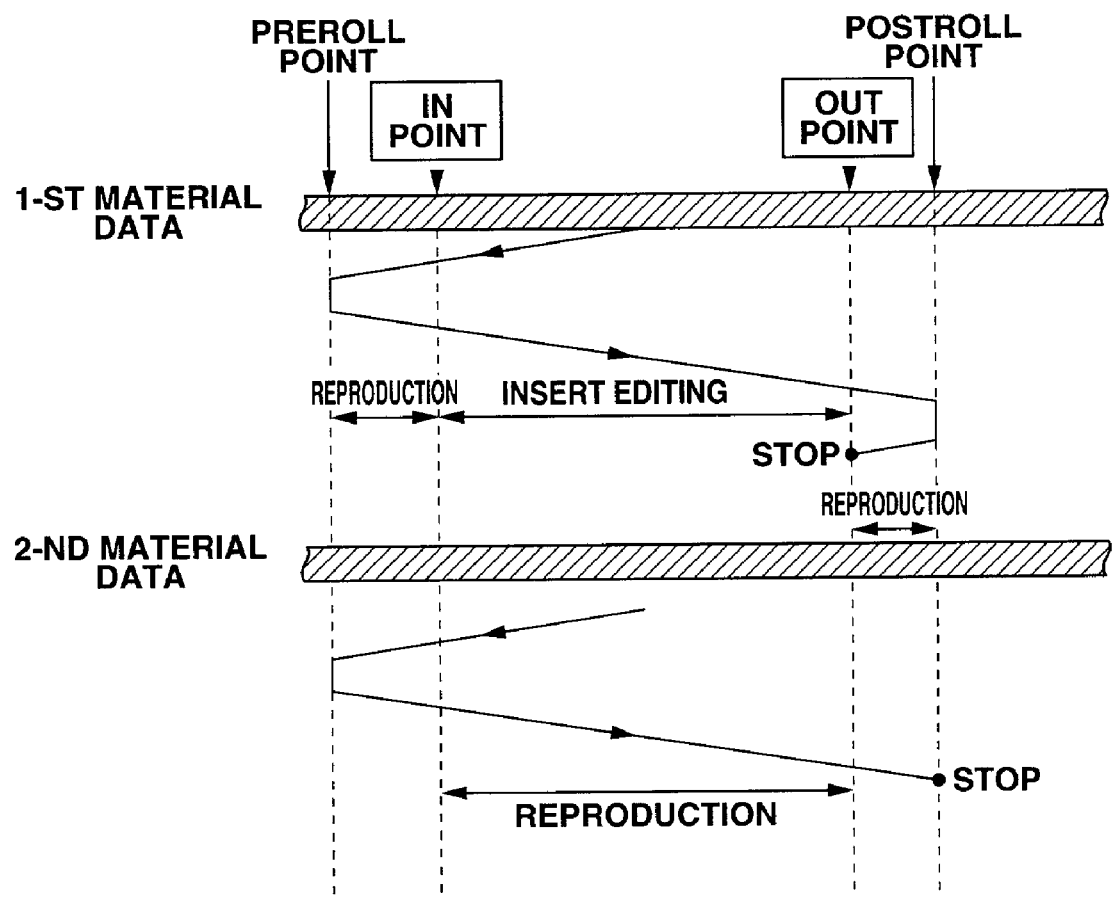
FIG. 15 is a view for explaining that reproduction by VTR emulation processing is carried out in the A/V server to which this invention is applied to carry out reproduction from pre-roll point to post-roll point.

At this time, the CPU 53 carries out VTR emulation processing shown in FIG. 15 in accordance with the operation input instruction corresponding to the fact that preroll button 221 is pushed down. Namely, the CPU 53 is operative so that when operation input signal to the effect that display is conducted on the display section 301 of the control panel 70 is inputted, it sequentially reads out, from respective reproduction ports 20, 30, 40, data from the preroll points to the postroll points of respective materials by using information of the preroll point and the postroll point and VFL for preview prepared at the step ST2 to output them to the control panel 70 through the I/F 52.

Namely, in the preview reproduction processing, as shown in FIG. 15, for example, reproduction is initially conducted from the preroll point of the first material data up to the in point thereof, reproduction is subsequently carried out from the in point to the out point of the second material data, and reproduction is subsequently carried out from the out point to the postroll point of the first material data.

Then, at step ST6, the CPU 53 conducts a control so as to delete, from the file management section 91, VFL for preview used when preview reproduction is carried out at the above-described step ST5.

At the subsequent step ST7, the CPU 53 carries out Cue Up processing to thereby control the control panel 70 so as to display still picture positioned at the in point or the out point set at material data reproduced at the above-described step ST5. At this time, the CPU 303 outputs, to the display memory 302, still picture positioned at the in point or the out point stored in the flash memory 304 to complete processing.

Explanation will be given with reference to FIG. 15. After reproduction is carried out up to the postroll point of the first material data at step ST5, reproduction is carried out up to the out point of the first material data toward opposite direction of the time axis from the postroll point of the first material data at step ST7.

Moreover, in the automatic editing processing, such an approach is employed to prepare VFL to sequentially reproduce data from the preroll point to the postroll point in accordance with editing points set at respective material data on the basis of this VFL to store the VFL as its editing result into the file management section 91.

Namely, at step ST8, the CPU 53 controls the file management section 91 so as to prepare VFL on the basis of in points and out points set every respective material data at the step ST2.

At the subsequent step ST9, the CPU 53 carries out VTR emulation processing to read out, from respective ports, respective material data from the preroll point to the postroll point similarly to the above-described step ST5 in accordance with the VFL prepared at the above-described step ST8 to display them on the display section 301 of the control panel 70, thus to carry out reproduction.

At the subsequent step ST10, the CPU 53 carries out Cue Up processing similarly to the above-described step ST7 to thereby control the control panel 70 so as to display still picture positioned at the in point or the out point set in the reproduced material data. At this time, the CPU 303 outputs, to the display memory 302, still picture positioned at the in point or the out point stored in the flash memory 304 to complete processing. In this case, in the automatic editing processing, unlike the above-described preview reproduction processing, the VFL file prepared at the above-described step ST8 is stored into memory or the HDD 100 included within the file management section 91 as editing result.

Another example where, in the above-described A/V server 1, in points and out points are set in respective material data as described above to prepare VFL will now be described.

Initially, in the case where operation input signal to the effect that user pushes down stop button 224 is inputted from the operation input section 305 when corresponding material data inputted from I/F 52 is displayed on the display section 301 in the state where operation input signal based on the fact that user operates editing in/out point designation button 262 is inputted so that in point is set in material data subject to editing processing, the CPU 303 allows picture positioned at the time point when the above-mentioned operation input signal is inputted to be picture at the out point. Namely, the CPU 303 allows picture stored in the display memory at the time point when the operation input signal is inputted to be picture at out point. Further, the CPU 303 outputs, to the file management section 91, time codes indicating the in point and the out point set with respect to material data through the timing manager 80 and the control bus 121 to thereby allow it to prepare VFL.

Further, the CPU 303 is adapted so that in the case where the in point and the output point are set in advance in material data displayed on the display section 301, when operation input signal to the effect that user pushes down stop button 224 is inputted from the operation input section 305, the CPU 303 changes picture at the out point set in advance to picture positioned at the time point when the above-mentioned operation input signal is inputted. Further, the CPU 303 outputs, to the file management section 91, time codes indicating out point and in point set for a second time with respect to material data through the timing manager 80 and the control bus 121 to allow it to prepare VFL. In accordance with the A/V server 1 which carries out such editing processing, even in the case where the in point and the out point are set in advance, it is possible to set the out point for a second time to prepare new VFL.

As described above, in accordance with the A/V server 1 to which this invention is applied, such an approach is employed to prepare, by CPU 303 of the control panel 70, VFL in which in points and out points are set in respective material data by time codes to prepare VFL described by address information at the file management section 91 to carry out preview reproduction and reproduction after editing processing of data from the preroll point to the postroll point set in the vicinity of the in point and the out point when reproducing material data on the basis of VFL. Accordingly, even when data recorded with respect to non-linearly reproducible recording medium is used to carry out editing processing, it is possible to present data after editing in a sense similar to VTR when carrying out emulation of VTR operation to present it to user.

Moreover, in accordance with this A/V server 1, since reproduction is carried out from the preroll point to the postroll point, it is possible to precisely confirm editing state of the in point and the out point.

Further, in accordance with this A/V server 1, even after reproduction is carried out from the preroll point to the postroll point, it is possible to present, to user, material data positioned at the in point or out point in accordance with operation input signal from the control panel 70 based on the fact that user operates such server.

Accordingly, in the data recording/reproducing apparatus and the data recording/reproducing method according to this invention, there is employed such an approach to set in point and out point in first and second material data to generate editing processing information for inserting the second material data into the first material data to prepare, on the basis of the editing processing information, first virtual file in which recording area of non-linearly accessible recording medium with respect to the first material data is described by time code and second virtual file in which recording area of recording medium with respect to the second material data is described by time code, thus making it possible to carry out, on the basis of time codes included in the first and second virtual files, reproduction from preroll point positioned forward in point of time with respect to the in point up to the postroll point positioned backward in point of time with respect to the out point. Accordingly, even when data recorded with respect to non-linearly reproducible recording medium is used to carry out editing processing, it is possible to carry out emulation of VTR operation, and to reduce disagreement of feeling as compared to the case where editing processing is carried out by using VTR to carry out reproduction.

The invention claimed is:

1. A data recording/reproducing apparatus comprising:
   recording/reproducing means for recording/reproducing material including video and/or audio data from a non-linearly accessible recording medium;
   information file preparing means for preparing an information file relating to a first time position located forward with respect to an editing time period of the recording/reproducing material and a second time position located backward with respect to the editing time period;
   control means for controlling the recording/reproducing means to reproduce edited material from the first time position to the second time position of the recording/reproducing material on the basis of the information file; and
   a control panel having respective controllers for automatic edit processing and preview processing to emulate a linearly accessible recording medium editor,
   wherein a recorded file is reproduced when in automatic edit processing, and a virtual file list is prepared when in preview processing on the non-linearly accessible recording medium.

2. The data recording/reproducing apparatus as set forth in claim 1, wherein the first time position is a preroll point with respect to the editing period and the second time position is a postroll point with respect to the editing period.

3. The data recording/reproducing apparatus as set forth in claim 2, wherein the information file preparing means further comprises reproduction file preparing means for preparing reproduction file indicating the editing time period, and storage means for storing in advance position information relating to period lengths up to the preroll point and the postroll point, thus to prepare the reproduction information from the reproduction file and the position information.

4. The data recording/reproducing apparatus as set forth in claim 3, wherein the reproduction file consists of information indicating reproduction start position from recording start position recorded on the recording medium of the material, and information indicating reproduction end position corresponding to material length to be reproduced from the reproduction start position.

5. The data recording/reproducing apparatus as set forth in claim 1, wherein when reproduction is completed from the first time position to the second time position at the recording/reproducing means, the control means deletes the information file.

6. The data recording/reproducing apparatus as set forth in claim 1, which further comprises display means on which the material reproduced from the recording/reproducing means is displayed,
wherein the material reproduced from the first time position to the second time position is displayed on the display means.

7. The data recording/reproducing apparatus as set forth in claim 1, wherein information relating to the first time position and the second time position comprise time codes.

8. The data recording/reproducing apparatus as set forth in claim 1, wherein information relating to the first time position and the second time position comprise address values on the recording medium.

9. A data recording/reproducing method of providing access to material including video and/or audio data the method comprising:
a first step of recording the material on a non-linearly accessible recording medium;
a second step of preparing information file relating to a first time position located forward with respect to an editing time period of the material and a second time position located backward with respect to the editing time period; and
a third step of reproducing edited material from the first time position to the second time position on the basis of the information file; and
a fourth step of automatic edit processing and preview processing to emulate a linearly accessible recording medium editor,
wherein a recorded file is reproduced when in automatic edit processing, and a virtual file list is prepared when in preview processing on the non-linearly accessible recording medium.

10. The data recording/reproducing method as set forth in claim 9, wherein the second step further includes a step of preparing a reproduction file indicating the editing time period, a step of storing a position information relating to a period length up to a preroll point and a postroll point, and a step of preparing the reproduction information from the reproduction file and the position information.

11. The data recording/reproducing method as set forth in claim 10, wherein the reproduction file consists of information indicating a reproduction start position from a recording start position recorded on the recording medium of the material, and information indicating a reproduction end position corresponding to material length to be reproduced from the reproduction start position.

12. The data recording/reproducing method as set forth in claim 9, wherein the first time position is a preroll point with respect to the editing time period, and the second time position is a postroll point with respect to the editing time period.

13. The data recording/reproducing method as set forth in claim 9, which further includes a fourth step of reproducing the material from the first time position to the second time position thereafter to delete the reproduction information.

14. The data recording/reproducing method as set forth in claim 9, which further includes a fifth step of displaying, on display means, the material which has been reproduced from the first time position to the second time position.

15. The data recording/reproducing method as set forth in claim 9, wherein information relating to the first time position and the second time position comprise time codes.

16. The data recording/reproducing method as set forth in claim 9, wherein information relating to the first time position and the second time position are address values on the recording medium.

17. A method of emulating linear reproducing editing material from a non-linearly accessible recording medium, the method comprising:
recording the editing material on the non-linearly accessible recording medium;
preparing an information file having a first time position located prior in time with respect to an editing material time period and a second time position located later in time with respect to the editing material time period;
reproducing the edited material from the first time position to the second time position on the basis of the information file; and
automatic edit processing and preview processing to emulate linear reproducing editing,
wherein a recorded file is reproduced when in automatic edit processing, and a virtual file list is prepared when in preview processing on the non-linearly accessible recording medium.

* * * * *